US008578759B2

(12) United States Patent
Calvo et al.

(10) Patent No.: US 8,578,759 B2
(45) Date of Patent: Nov. 12, 2013

(54) UNDERSEA PIPELINE INTRUSION DETECTION SYSTEM USING LOW-FREQUENCY GUIDED ACOUSTIC WAVES AND DISTRIBUTED OPTICAL FIBER

(75) Inventors: David C. Calvo, Alexandria, VA (US); Jill P. Bingham, Norfolk, VA (US); Michael Nicholas, Washington, DC (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 220 days.

(21) Appl. No.: 13/290,302

(22) Filed: Nov. 7, 2011

(65) Prior Publication Data

US 2012/0180552 A1 Jul. 19, 2012

Related U.S. Application Data

(60) Provisional application No. 61/413,552, filed on Nov. 15, 2010, provisional application No. 61/470,535, filed on Apr. 1, 2011.

(51) Int. Cl.
*G01M 3/38* (2006.01)
(52) U.S. Cl.
USPC .............................. 73/40.5 A; 73/643; 73/655

(58) Field of Classification Search
USPC ........... 73/643, 40.5 A; 385/12, 13, 123, 125, 385/127; 359/900
See application file for complete search history.

(56) References Cited

U.S. PATENT DOCUMENTS

| 4,770,492 | A | * | 9/1988 | Levin et al. ..................... 385/13 |
| 5,493,629 | A | * | 2/1996 | Stange ........................... 385/125 |
| 5,841,913 | A | * | 11/1998 | Marcuse et al. ................. 385/7 |
| 6,945,114 | B2 | * | 9/2005 | Kenderian et al. .............. 73/643 |
| 8,276,462 | B2 | * | 10/2012 | Tao et al. ........................ 73/800 |

* cited by examiner

*Primary Examiner* — J M Saint Surin
(74) *Attorney, Agent, or Firm* — US Naval Research Laboratory; Suresh Koshy

(57) ABSTRACT

A method and an apparatus for intrusion detection. The apparatus includes an acoustic source, a laser light source, a pressure-sensitive optical fiber including a first end and a second end. The second end is connected to the laser light source and oriented toward the acoustic source. The laser light source generates a laser pulse traveling through the pressure-sensitive optical fiber toward the acoustic source. The laser pulse includes a time-of-flight. The acoustic source generates an acoustic wave. The acoustic wave includes a plurality of evanescent wave fronts. The plurality of evanescent wave fronts, upon scattering from a non-uniform material region, radially contracts the pressure-sensitive optical fiber to alter the time-of-flight of the laser pulse along the pressure-sensitive optical fiber by increasing the fiber length.

16 Claims, 4 Drawing Sheets

UNDERSEA PIPELINE INTRUSION DETECTION SYSTEM USING LOW-FREQUENCY GUIDED ACOUSTIC WAVES AND DISTRIBUTED OPTICAL FIBER

CROSS-REFERENCE TO RELATED APPLICATIONS

This application claims the benefit of U.S. Provisional Application 61/413,552 filed on Nov. 15, 2010 and of U.S. Provisional Application 61/470,535 filed on Apr. 1, 2011.

BACKGROUND OF THE INVENTION

Maintaining the security and physical integrity of undersea pipelines is vital to the economic and environmental stability of the modern world. The sheer length of undersea pipeline is vast, e.g., approximately 30,000 miles of pipeline exist on the Gulf of Mexico seafloor alone. These lengths present a formidable challenge to any undersea monitoring system requiring persistence. Because of the potential severity of an undersea pipeline rupture, the detection, localization, and timely prosecution of an intrusion are critical. Intrusion is here defined as the introduction of an undesired material element that is normally not, present within a radial proximity to the pipeline or an incipient mechanical vibration of material elements normally present within the proximity. Intrusions include, for example, undersea vehicles (manned or unmanned remotely operated or autonomous), underwater robots, divers, diver delivery vehicles, directed or intense sound waves, or leaking fluid from within the pipeline entering the exterior proximity. A need therefore exists for a persistent monitoring system able to detect objects or disturbances in proximity to the pipeline.

Traditional means for monitoring the proximity of an undersea pipeline typically involve mounting a relatively high-frequency acoustic sonar "search light" on or near the pipeline at regular intervals or monitoring by undersea vehicles. These alternative approaches, while possibly adequate over short pipe lengths or restricted regions, become logistically or financially prohibitive over time. Systems that operate at 60 kHz, for example, require mounting an acoustic source every 1 or 2 km. Besides the installation expense, this permanent installation of many sources incurs practical difficulties due to fouling of the hardware and the expense of servicing the equipment. Moreover, it may be impractical to install a pipe-mounted or pile-moored acoustic source in deep water in a given situation. Communications, telemetry or power equipment associated with this conventional sonar approach may also be visible above the water line, which may be undesirable depending on a given situation.

BRIEF SUMMARY OF THE INVENTION

An embodiment of the invention includes an apparatus. This apparatus includes an acoustic source, a laser light source, a pressure-sensitive optical fiber comprising a first end and a second end. The second end is connected to the laser light source and oriented toward the acoustic source. The laser light source generates a laser pulse traveling through the pressure-sensitive optical fiber toward the acoustic source. The laser pulse includes a time-of-flight (i.e., the time it takes for the pulse to get from the laser light source to an energy detector). The acoustic source generates an acoustic wave. The acoustic wave includes a plurality of evanescent wave fronts. The plurality of evanescent wave fronts, upon scattering from a non-uniform material region, radially contracts the pressure-sensitive optical fiber to alter the time-of-flight of the laser pulse along the pressure-sensitive optical fiber by locally increasing the fiber length.

Optionally, the apparatus further includes an energy detector connected to the first end of the pressure-sensitive optical fiber for receiving the laser pulse, and detecting the time-of-flight of the laser pulse.

Optionally, the acoustic wave includes an acoustic wavelength. Optionally, the apparatus further includes a pipe axially parallel to the pressure-sensitive optical fiber. The pipe includes a pipe exterior surface and a pipe radius. The acoustic source is located outside of the pipe radius and within about a distance of the acoustic wavelength from the pipe exterior surface. The second end is connected to the pulsed laser light source and oriented toward the acoustic source. The pulsed laser light source generates a laser pulse traveling through the pressure-sensitive optical fiber toward the acoustic source. The laser pulse comprising a time-of-flight, said acoustic wave comprising a plurality of evanescent wave fronts that, upon scattering from a non-uniform material region, radially contract said pressure-sensitive optical fiber so as to alter the time-of-flight of said laser pulse along said pressure-sensitive optical fiber by locally increasing the fiber length.

Optionally, the pipe includes an undersea pipeline. Optionally, the pressure-sensitive optical fiber adjoins the pipe. Optionally, the apparatus further includes a polymer strip adjoining the pipe; the polymer strip surrounds the pressure-sensitive optical fiber. Optionally, the pressure-sensitive optical fiber is coiled within the polymer strip.

Optionally, the acoustic source includes a monopole or a horizontal dipole. Optionally, the pressure-sensitive optical fiber includes a single-mode optical fiber or a multi-mode optical fiber. Optionally, the laser light source is a pulsed laser light source or a continuous wave laser light source. Optionally, the apparatus further includes a pressure-insensitive optical fiber located adjacent to the pressure-sensitive optical fiber; a beam splitter connecting the continuous wave laser light source to the pressure-sensitive optical fiber and the pressure-insensitive optical fiber; and an interferometer connecting the pressure-sensitive optical fiber and the pressure-insensitive optical fiber, the interferometer detecting a scattered acoustic phase.

An alternative embodiment of the invention includes a method. A pipe is provided and includes a pipe length, a pipe radius, and a pipe exterior surface. An acoustic wave is generated with an acoustic source, the acoustic wave including an acoustic wavelength, the acoustic source being located outside of the pipe radius and within about a distance of the wavelength from the pipe exterior surface, the acoustic wave including a plurality of evanescent wave fronts. A pressure-sensitive optical fiber is provided adjacent to the pipe and includes a first end and a second end, said second end connected to the pulsed laser light source and oriented toward the acoustic source. A laser pulse is generated by a laser light source and travels through the pressure-sensitive optical fiber toward the acoustic source, the laser pulse including a time-of-flight, the plurality of evanescent wave fronts, upon scattering from a non-uniform material region, radially contract the pressure-sensitive optical fiber so as to alter the time-of-flight of the laser pulse along the pressure-sensitive optical fiber by increasing the fiber length.

Optionally, the time-of-flight of the laser pulse is detected with an energy detector connected to the first end of the pressure-sensitive optical fiber. Optionally, the method further includes scattering the acoustic wave with an object to generate the acoustic scattered field.

Optionally, the laser light source includes a pulsed laser light source or a continuous wave laser light source. Optionally, the method further includes providing a pressure-insensitive optical fiber located adjacent to the pressure-sensitive optical fiber, the continuous wave laser light source being connected to the pressure-insensitive optical fiber and the pressure-sensitive optical fiber; providing an interferometer connected to the pressure-insensitive optical fiber and the pressure-sensitive optical fiber; and detecting a scattered acoustic phase using the interferometer.

In an embodiment of the invention, the use of optical fiber is advantageous because, for leak detection, the fiber responds to the slow thermal changes of the surrounding fluid by a change in fiber length near the leak location. In an another embodiment of the invention, the use of optical fiber is advantageous because it can respond to a sound wave beam, such as a sonar pulse coming from an intruding undersea vehicle.

DETAILED DESCRIPTION OF THE INVENTION

Figure 1:
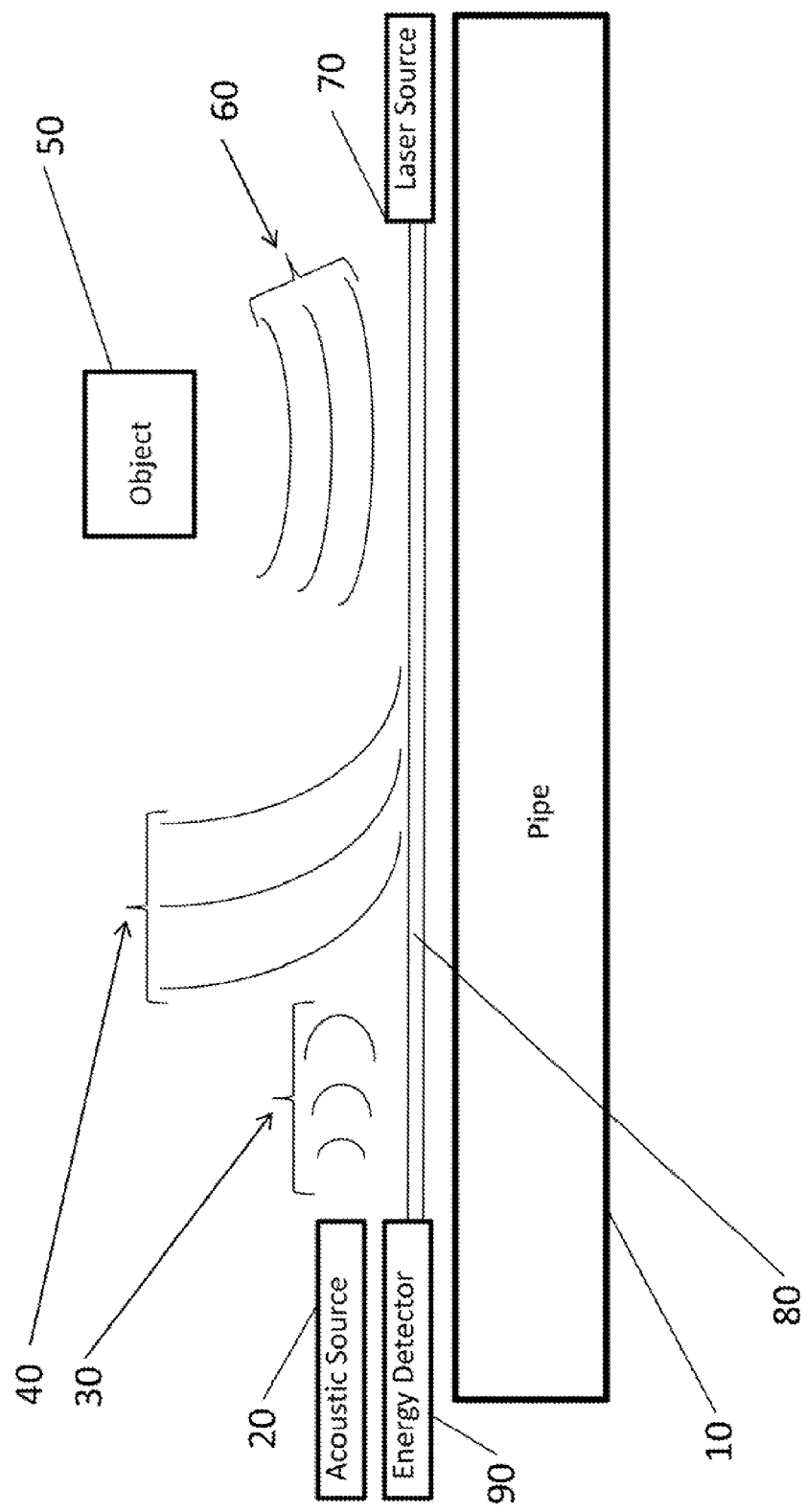
FIG. 1 is a block diagram of a first embodiment of the instant invention.
Figure 2A:
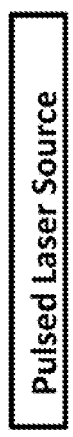
FIGS. 2a-2c are block diagrams of three illustrative laser light sources according to different embodiments of the instant invention.
Figure 2B:
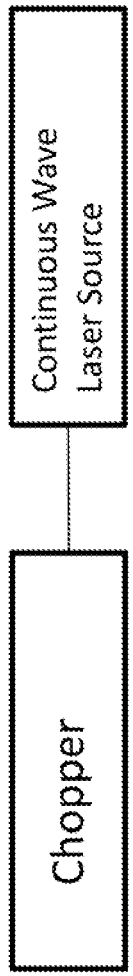
Figure 2C:
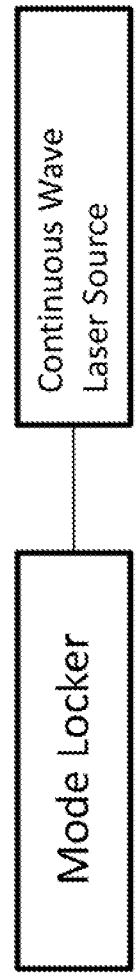

The use of low-frequency structure-guided acoustic waves is an advantageous approach for detecting an intrusion because these waves are able to propagate great distances without suffering geometrical signal attenuation. This is in contrast to an acoustic signal originating from a point source in unbounded three-dimensional space which decays with the inverse of the propagation distance in all directions. Low-frequency waves also suffer less irrecoverable attenuation (i.e., volume scattering or intrinsic dissipation) associated with inhomogeneous pipe contents or acoustic sediment loss. These waves also have the potential to excite resonant characteristics in intruding objects that are a few wavelengths long or contain very compressible substances such as air.

Because the speed of sound in bulk crude oil is approximately 1300 m/s and that of water is 1500 m/s, it is possible to obtain guided-wave modes in an oil-filled pipeline similar to the way in which light is guided by an optical fiber. For example, Applicants have determined that for low-frequency excitation of an oil-filled steel pipe underwater there are actually 3 predominant mode types: a fast steel-borne wave travelling near 5000 m/s, a slow wave supported mainly by the interior fluid with speed under 1300 m/s, and a mode that interacts significantly with the water, steel, and oil and generally features a substantial evanescent tail that penetrates the exterior water. This mode propagates at speeds slightly less than 1500 m/s; Applicants refer to this mode as the $\alpha 2$ mode. Although the tail decays exponentially in the radial direction, the $\alpha 2$ mode can significantly penetrate the exterior medium at low frequencies by several wavelengths when the mode speed is just under 1500 m/s. In practice, this is obtained by tuning the acoustic excitation frequency. An embodiment of the instant invention exploits the $\alpha 2$ mode because it meets the requirements of wide reach down the pipeline while still significantly penetrating the exterior water. It is also less sensitive to loss caused by pipe contents than the mainly interior-fluid-supported mode.

The pipe, its contents, and the proximal surrounding water, together act as a waveguide that extends the axial range of the source. An acoustic source that is located within the outer proximity of the pipe, with an outermost extent of a few acoustic wavelengths in radius, benefits from this waveguide.

Although the $\alpha 2$ mode does not suffer geometrical attenuation, a pulse comprising a spectral band of these $\alpha 2$ modes will suffer signal attenuation due to group velocity dispersion of its individual spectral components. This effect appears as a flattening or spreading out of the pulse with propagation distance. The effect can be mitigated by using a pulse with a narrow bandwidth. This corresponds to a pulse with many cycles within its envelope. The effects of group velocity dispersion will become important over a distance proportional to the number of cycles under the envelope squared. The more cycles present under the envelope (i.e., narrower bandwidth), the longer the acoustic pulse can travel without suffering appreciable amplitude loss due to dispersion.

Intruding objects that encounter the evanescent tail of the $\alpha 2$ mode will generally scatter sound in many directions. Some sound can radiate out of the waveguide in the radial direction, and some can couple into backward and forward travelling $\alpha 2$ guided modes. Sound scatters in the inward radial direction, causing a spatially averaged non-zero acoustic pressure on the pipe surface at the axial range of the object. Embodiments of the invention can be used to detect and localize an intrusion based on this scattering, and are described by way of non-limiting example below.

A first embodiment of the instant invention is described as follows, with reference to FIGS. 1 and 2a-2c. A standard pipe 10 surrounded by water and containing a fluid acts as an acoustic waveguide transmission channel. A standard acoustic source 20 transmits an acoustic wavepacket pulse 30 consisting of many cycles off carrier frequency. The carrier frequency is chosen such that a substantial evanescent wave tail 40 penetrates the water. For example, the ideal carrier frequency is 0.8 times the frequency for which the acoustic wavelength in a free-field of water matches the diameter of the pipe. For carrier frequencies near this frequency, an acoustic source located about two carrier wavelengths from the surface of the pipe optimally excites the $\alpha 2$ mode without unnecessarily exciting the other modes. An intruding object 50 comes within some radial perimeter of the pipe 10 and encounters the evanescent acoustic wave 40. This creates an acoustic scattered field 60 that is incident on the pipe surface. A standard laser light source 70 in pulsed operation generates an optical wavepacket pulse. The optical pulse is launched into a pressure-sensitive optical fiber 80 located proximate to the pipe 10. The optical fiber is either single-mode optical fiber or a multi-mode optical fiber. This optical pulse encounters the segment of pressure-sensitive optical fiber 80 in the axial neighborhood of the acoustic scattering 60. A net change in length of the optical fiber occurs near the axial location where acoustic scattering takes place The incident acoustic pulse wavepacket travelling towards the position of the object causes zero net change in the fiber length due to cancellation of positive and negative pressures of its many carrier wave cycles. Therefore, a freely propagating $\alpha 2$ mode travelling forward or backward down the pipe does not create a time-of-flight change for the optical pulse. Only in the axial neighborhood where acoustical scattering occurs, will a net change of fiber length occur, which causes a time-of-flight variation of the optical pulse. The time-of-flight variation correlates with the carrier wave frequency of the acoustic pulse. The optical pulse is received, for example, by a standard photodetector and then digitized by a standard computer and standard data acquisition system. A standard signal processing algorithm is used which bandpass-filters the received signal to examine time-of-flight variations which correlate with the acoustic carrier wave frequency. The signal processing algorithm then windows the segments of the received time series adjacent to the time window containing the pulse. A standard integration and thresholding method is used to monitor the integrated signal intensity (the energy) received by the photodetector in these time windows. An energy detector 90 includes, for example, the photodetector, the digitizer, the computer, the data acquisition system, and the signal processing algorithm. The energy detector responds when any normally empty time windows fill with energy above some designated threshold as a result of an intrusion-induced time delay of the optical pulse.

Illustrative acoustic sources 20 include piezoceramic sources operating in either a monopole or dipole mode. Powerful low-frequency piezoceramic acoustic sources with the so-called flextensional design may also be used for the frequency range 500 to 1500 Hz.

The laser light source 70 is, for example, a standard pulsed laser light source 72 or a standard continuous wave laser light source 74. If a continuous wave laser light source 74 is used, a standard optical chopper or a standard mode locker is coupled thereto to create pulsing. Illustrative laser light sources include dye lasers, excimer lasers, as lasers, solid-state lasers, and diode lasers.

For the purpose of this discussion, intrusions are, for example, objects such as people or undersea vehicles. Alternatively, intrusions include fluid leaks from the pipe. An example of a fluid leak is an oil leak from a pipe rupture. Alternatively, the system can act in an acoustically passive mode in which an optical time-of-flight delay is created if the fiber is ensonified by an intruding sonar beam directed normal to the fiber axis.

Optionally, the pressure-sensitive optical fiber 80 and the pipe are located at a distance from each other. Having the optical fiber some radial distance from the pipe can be important if the scattered acoustic waves are very weak in comparison with the forward propagating evanescent waves. During normal operation, the basis of the detection scheme is that only the "squeezing" of the optical fiber caused by the scattered acoustic wave at the object range creates an optical time-of-flight change. If, however, the forward propagating evanescent acoustic waves create a time-of-flight fluctuation of the optical pulse even without an intrusion present (as might happen if the acoustic source pulse were very broadband instead of narrow-band), then creating radial separation between the optical fiber 80 and the pipe 10 improves the detectability of the intrusion. This works because the evanescent waves exponentially decay radially and would be weak at large enough stand-off distances whereas the scattered waves generally radiate in all directions and could reach the fiber at some stand-off distance from the pipe 10.

Alternatively, the pressure-sensitive optical fiber 80 lies against the pipe 10. An advantage of having the fiber 80 on the pipe 10 is that the scattered acoustic waves from the intrusion will approximately double in amplitude when they reflect from the hard surface of the pipe. The optical fiber therefore elongates more than it would if it were not on the pipe surface. The greater elongation leads to a larger variation of the optical time-of-flight, and therefore a more detectable intrusion.

This first embodiment of the invention achieves reception by making use of for example, a single-mode optical fiber along the entire pipeline length. Although optical fiber is used owing to its sensitivity to acoustic waves, it has an added benefit of being sensitive to localized temperature changes in the water that would be created by a leak of pipe contents. The type of optical fiber selected depends on the needs of the particular application concerning sensitivity to acoustic waves. It is well-known that sound waves affect the phase of light waves travelling through a fiber partly by increasing the fiber core length (via pressure induced strain) and by changing the intrinsic index of refraction of the glass core. For a sound wave travelling axially down the fiber, the corresponding acoustic phase change of the light alternates between broadening and shortening depending on if it is in a length segment that is being compressed or expanded. The net phase distortion of an optical pulse caused by a freely propagating rightward or leftward travelling many-cycle oscillatory acoustic pulse is zero due to cancellations of fiber strain. Specifically, because the strain appears oscillatory along the length, the spatial integral of the surface pressure caused by freely propagating acoustic wavepackets will be close to zero. However, near the pipe surface at the axial position of the object, the scattered acoustic field is directed broadside to the pipe, and therefore a cumulative change of optical phase that is non-zero is generated. Mathematically, this is similar to a stationary phase point of an integral with an oscillating integrand. Physically, the localized scattering is like a person stepping on the optical fiber causing an increase in its length; the length actually lengthens or shortens due to the phase of the pressure wave. Therefore, a significant optical pulse arrival time difference relative to the intrusion-free state occurs when an intrusion is near the pipe.

Figure 3:
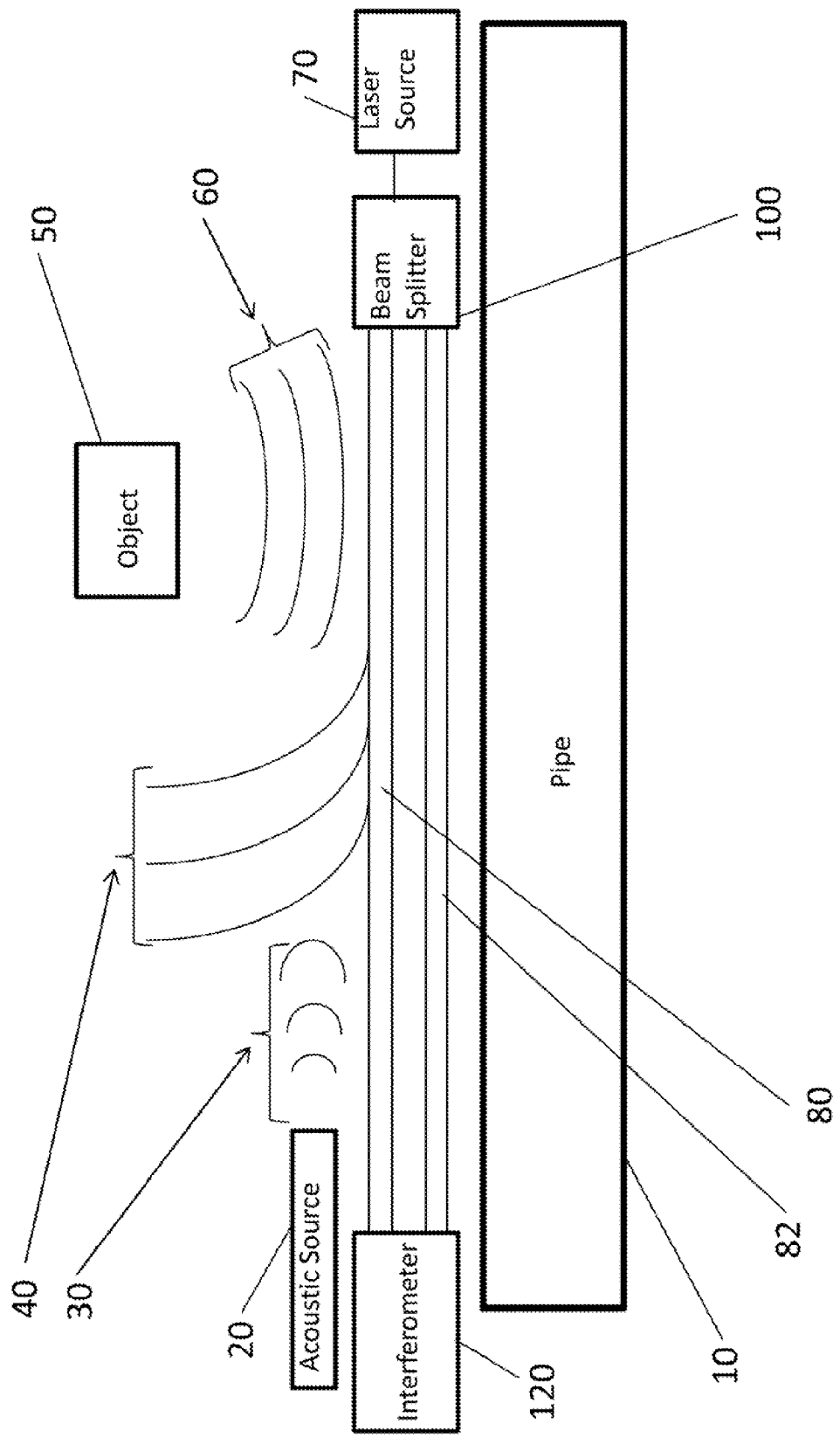
FIG. 3 is 2 is a block diagram of a second embodiment of the instant invention.

A second embodiment of the instant invention is described as follows with reference to FIG. 3. In this embodiment, two optical fibers 80, 82, are used. One of the optical fibers is a pressure-sensitive optical fiber 80. The other optical fiber is a pressure insensitive optical fiber 82 and is used as a reference leg or reference fiber. Also, in this embodiment, for example, continuous light waves from a continuous wave laser light source 74 are used, not laser pulses A continuous laser light wave is split using a standard beam splitter 100 and inserted into both optical fibers 80, 82.

The outputs of both fibers 80, 82 are then combined in an industry standard manner, and a standard interferometer 120 is used to image both the forward propagating and backscattered acoustic pulses. By way of example, when the light emerges from the fibers 80, 82 after transiting the pipeline, they are recombined and collimated into a single beam that is aimed at a standard photodetector. The photodetector only responds to slow variations of the light intensity caused by the pressure-induced phase difference between the light waves transiting the two different fiber types. The presence of interference fringes either in time or projected in space correlates with pressure waves propagating down the pipeline. Since the object scatters an acoustic wave, a new optical fringe pattern will arise due to the acoustic backscattering. The forward scattered field can also be seen as a phase modification of the acoustic that would be present in the absence of the intrusion. The advantage of using the interferometer is that it enables a more sensitive detection scheme in the event the time-of-flight delay is not large in the first embodiment due to weak scattering from a given intrusion. The tracking of interference, fringes and correlation with acoustic pulses can also be used to localize a new fringe pattern associated with an intrusion scattering event.

Figure 4:
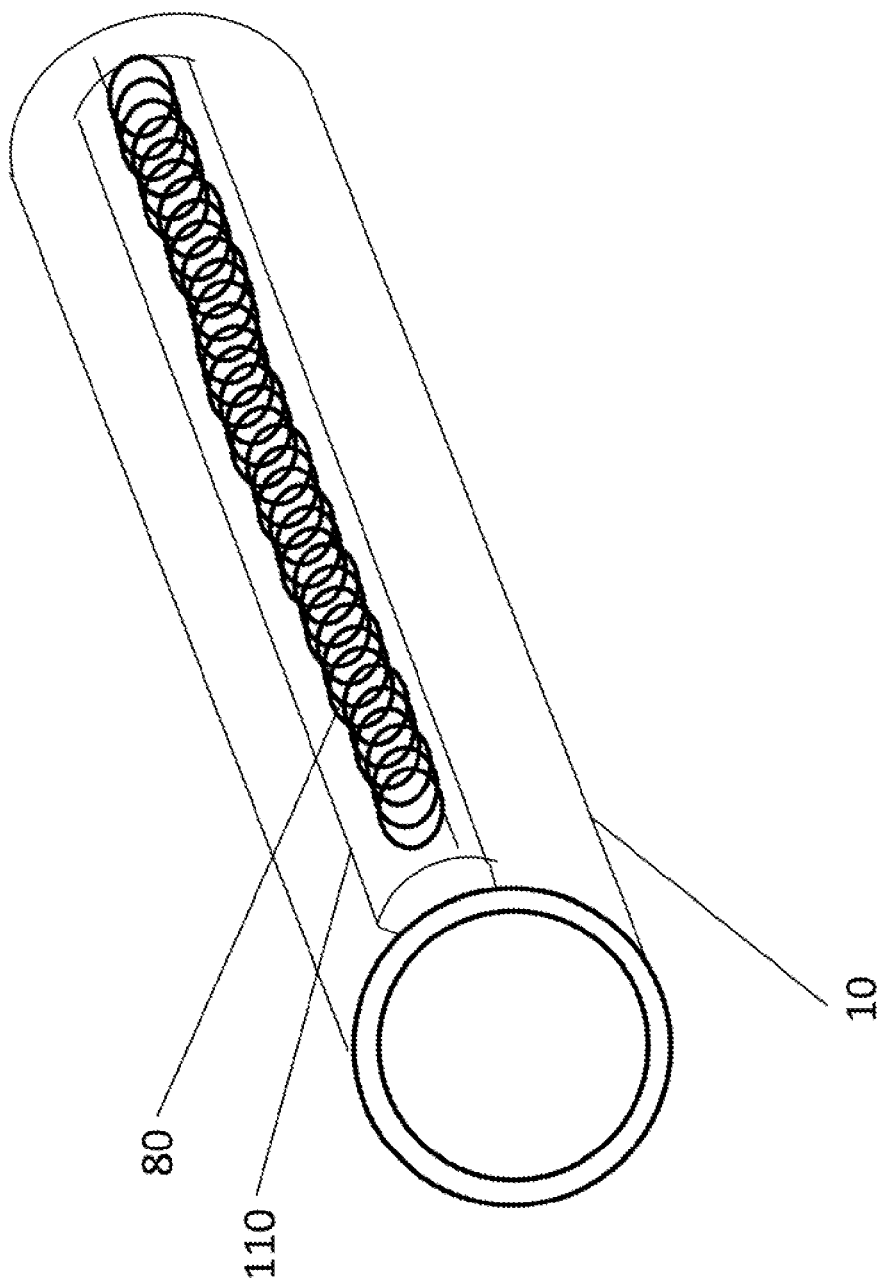
FIG. 4 is a perspective view of an embodiment of an illustrative strip located on a pipe surface.

An additional aspect of the instant invention, which could be used with either of the above-mentioned embodiments is described as follows, with, reference to FIG. 4. This aspect advantageously enhances optical phase sensitivity to pressure waves. To provide a gain in pressure sensitivity, a highly sound-sensitive optical fiber 80 is wound in a pattern that resembles many offset circles. All the coils of the optical fiber 80 lie in the same horizontal plane as shown and are embedded in a polymer strip 110 which has an acoustic impedance similar to water. For example, the polymer strip 110 is made of polyurethane. The embedding serves to physically secure the fiber windings. The coiled optical fiber is therefore secured in the polymer strip 110 that is attached to the pipeline, but does not have to be rigidly attached The coils lead to a larger fiber elongation for a given area of uniform pressure. The gain over a straight fiber length can be increased by using more coils per unit length of pipe. This coiled optical fiber design is similar in intent to the planar acoustic fiber sensor reported by Lagakos, et al, 1990, incorporated herein by reference. [N. Lagakos, T. R. Hickman, P. Erhrenfeuchter, J. A. Bucaro, and A. Dandridge, "Planar Flexible Fiber-Optic Acoustic Sensors", *Journal of Lightwave Technology*, Vol. 8. No 9, pgs 1298-1303, (1990)].

An embodiment of the invention comprises a computer program for processing outputs of the optical fibers to detect acoustic phase changes, which computer program embodies the functions, filters, or subsystems described herein. However, it should be apparent that there could be many different ways of implementing the invention in computer programming, and the invention should not be construed as limited to any one set of computer program instructions. Further, a skilled programmer would be able to write such a computer program to implement an exemplary embodiment based on the appended diagrams and associated description in the application text. Therefore, disclosure of a particular set of program code instructions is not considered necessary for an adequate understanding of how to make and use the invention. The inventive functionality of the claimed computer program will be explained in more detail in the following description read in conjunction with the figures illustrating the program flow.

One of ordinary skill in the art will recognize that the methods, systems, and control laws discussed above with respect to acoustic phase detection may be implemented in software as software modules or instructions, in hardware (e.g., a standard field-programmable gate array ("FPGA") or a standard application-specific integrated circuit ("ASIC"), or in a combination of software and hardware. The methods, systems, and control laws described herein may be implemented on many different types of processing devices by program code comprising program instructions that are executable by one or more processors. The software program instructions may include source code, object code, machine code, or any other stored data that is operable to cause a processing system to perform methods described herein.

The methods, systems, and control laws may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and/or data structures described herein may be connected directly or indirectly to each other in order to allow the flow of data needed for their operations. It is also noted that software instructions or a module can be implemented for example as a subroutine unit or code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

Systems and methods disclosed herein may use data signals conveyed using networks (e.g., local area network, wide area network, interact, etc.), fiber optic medium, carrier waves, wireless networks, etc. for communication with one or more data processing devices. The data signals can carry any or all of the data disclosed herein that is provided to or from a device.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed as new and desired to be protected by Letters Patent of the United States is:

1. An apparatus comprising:
    an acoustic source;
    a laser light source;
    a pressure-sensitive optical fiber comprising a first end and a second end, said second end connected to said laser light source and oriented toward said acoustic source, said laser light source generating a laser pulse traveling through said pressure-sensitive optical fiber toward said acoustic source, said laser pulse comprising a time-of-flight, said acoustic source generating an acoustic wave, said acoustic wave comprising a plurality of evanescent wave fronts, said plurality of evanescent wave fronts, upon scattering from a non-uniform material region, radially contract said pressure-sensitive optical fiber to alter the time-of-flight of said laser pulse along said pressure-sensitive optical fiber by locally increasing the fiber length.

2. The apparatus according to claim 1, further comprising:
    an energy detector connected to said first end of said pressure-sensitive optical fiber for receiving said laser pulse, and detecting the time-of-flight of said laser pulse.

3. The apparatus according to claim 1, wherein said acoustic wave comprises an acoustic wavelength, said apparatus further comprising a pipe axially parallel to said pressure-sensitive optical fiber, said pipe comprising a pipe exterior surface and a pipe radius, said acoustic source being located outside of the pipe radius and within about a distance of the acoustic wavelength from the pipe exterior surface, said second end connected to said pulsed laser light source and oriented toward said acoustic source, said pulsed laser light source generating a laser pulse traveling through said pressure-sensitive optical fiber toward said acoustic source, said laser pulse comprising a time-of-flight, said acoustic wave comprising a plurality of evanescent wave fronts that, upon scattering from a non-uniform material region, contract said pressure-sensitive optical fiber so as to alter the time-of-flight of said laser pulse along said pressure-sensitive optical fiber.

4. The apparatus according to claim 3, wherein said pipe comprises an undersea pipeline.

5. The apparatus according to claim 3, wherein said pressure-sensitive optical fiber adjoins said pipe.

6. The apparatus according to claim 3, further comprising a polymer strip adjoining said pipe, said polymer strip surrounding said pressure-sensitive optical fiber.

7. The apparatus according to claim 6, wherein said pressure-sensitive optical fiber is coiled within said polymer strip.

8. The apparatus according to claim 1, wherein said acoustic source comprises one of a pulsating monopole and a horizontal dipole.

9. The apparatus according to claim 1, wherein said pressure-sensitive optical fiber comprises one of a single-mode optical fiber and a multi-mode optical fiber.

10. The apparatus according to claim 1, wherein said laser light source is one of a pulsed laser light source and a continuous wave laser light source.

11. The apparatus according to claim 10, further comprising:
- a pressure-insensitive optical fiber located adjacent to said pressure-sensitive optical fiber;
- a beam splitter connecting said continuous wave laser light source to said pressure-sensitive optical fiber and said pressure-insensitive optical fiber; and
- an interferometer connecting said pressure-sensitive optical fiber and said pressure-insensitive optical fiber, said interferometer detecting a scattered acoustic phase.

12. A method comprising:
- providing a pipe comprising a pipe length, a pipe radius, and a pipe exterior surface;
- generating, with an acoustic source an acoustic wave, the acoustic wave comprising an acoustic wavelength, the acoustic source being located outside of the pipe radius and within about a distance of the wavelength from the pipe exterior surface, the acoustic wave comprising a plurality of evanescent wave fronts;
- providing a pressure-sensitive optical fiber adjacent to the pipe and comprising a first end and a second end, said second end connected to the pulsed laser light source and oriented toward the acoustic source;
- generating a laser pulse traveling through the pressure-sensitive optical fiber toward the acoustic source, the laser pulse comprising a time-of-flight, the plurality of evanescent wave fronts, upon scattering from a non-uniform material region, radially contract the pressure-sensitive optical fiber so as to alter the time-of-flight of the laser pulse along the pressure-sensitive optical fiber by increasing the fiber length.

13. The method according to claim 12, further comprising:
detecting the time-of-flight of the laser pulse with an energy detector connected to the first end of the pressure-sensitive optical fiber.

14. The method according to claim 12, further comprising:
scattering the acoustic wave with an object to generate the acoustic scattered field.

15. The method according to claim 12, wherein the laser light source comprises one of a pulsed laser light source and a continuous wave laser light source.

16. The method according to claim 15, further comprising:
- providing a pressure-insensitive optical fiber located adjacent to said pressure-sensitive optical fiber, the continuous wave laser light source being connected to the pressure-insensitive optical fiber and the pressure-sensitive optical fiber;
- providing an interferometer connected to the pressure-insensitive optical fiber and the pressure-sensitive optical fiber; and
- detecting a scattered acoustic phase using the interferometer.

* * * * *